(12) United States Patent
Beneker et al.

(10) Patent No.: US 8,827,584 B2
(45) Date of Patent: *Sep. 9, 2014

(54) WOBBLE JOINT FITTING FOR AN ADJUSTMENT DEVICE OF A MOTOR VEHICLE SEAT

(71) Applicant: C. Rob. Hammerstein GmbH & Co. KG, Solingen (DE)

(72) Inventors: Wilfried Beneker, Leichlingen (DE); Reinhard Vogel, Erkrath (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,483

(22) Filed: May 7, 2013

(65) Prior Publication Data

US 2013/0241262 A1    Sep. 19, 2013

Related U.S. Application Data

(63) Continuation of application No. 12/398,146, filed on Mar. 4, 2009, now Pat. No. 8,434,961.

(30) Foreign Application Priority Data

Mar. 4, 2008   (DE) .......................... 10 2008 012 528

(51) Int. Cl.
*B60N 2/02* (2006.01)
*B60N 2/225* (2006.01)

(52) U.S. Cl.
CPC .............. *B60N 2/225* (2013.01); *B60N 2/2254* (2013.01); *B60N 2/2252* (2013.01)
USPC ........... 403/97; 403/101; 403/322.1; 297/362

(58) Field of Classification Search
USPC ............ 403/92, 93, 97, 101, 103, 321, 322.1, 403/325, 326, 327; 411/517; 297/354.11, 297/354.12, 362, 369, 367 P, 367 R, 373
See application file for complete search history.

(56) References Cited

U.S. PATENT DOCUMENTS

| 1,758,515 | A | 5/1930 | Heiermann |
| 2,509,081 | A | 5/1950 | Bluth et al. |
| 3,701,303 | A | 10/1972 | Kondo |
| 4,692,079 | A | 9/1987 | Killian et al. |

(Continued)

FOREIGN PATENT DOCUMENTS

| DE | 1 580 541 A1 | 10/1970 |
| DE | 36 08 858 A1 | 10/1987 |

(Continued)

*Primary Examiner* — Michael P Ferguson
(74) *Attorney, Agent, or Firm* — McCarter & English LLP

(57) ABSTRACT

A wobble joint fitting for an adjustment device of a motor vehicle seat, in particular for a seat back hinge fitting, comprises (a) a first fitting part comprising an internal ring gear, (b) a toothed eccentric gear that engages the internal ring gear and that has an eccentric hole, (c) an eccentric to which a rotatable drive part is associated and which comprises wedge segments, (d) a second fitting part that is adjustable with respect to the first fitting part, and (e) a wrap spring. The wrap spring is a flat open spring ring and extends over an angle of less than 360°. The eccentric gear comprises a collar for the spring ring to fit against.

23 Claims, 3 Drawing Sheets

(56) References Cited

U.S. PATENT DOCUMENTS

| | | |
|---|---|---|
| 5,634,380 A | 6/1997 | Scholz et al. |
| 5,871,414 A | 2/1999 | Voss et al. |
| 5,984,413 A | 11/1999 | Baloche et al. |
| 6,065,920 A | 5/2000 | Becker et al. |
| 7,455,361 B2 | 11/2008 | Stemmer et al. |
| 7,497,519 B2 | 3/2009 | Dill et al. |
| 7,648,203 B2 | 1/2010 | Voss et al. |
| 8,434,961 B2 * | 5/2013 | Beneker et al. .................. 403/97 |
| 2006/0025270 A1 | 2/2006 | van de Geer et al. |
| 2008/0193203 A1 | 8/2008 | Voss et al. |

FOREIGN PATENT DOCUMENTS

| | | |
|---|---|---|
| DE | 102 030 06 A1 | 8/2003 |
| DE | 10 2004 007 043 B3 | 6/2005 |
| DE | 10 2005 054 489 A1 | 5/2007 |

* cited by examiner

WOBBLE JOINT FITTING FOR AN ADJUSTMENT DEVICE OF A MOTOR VEHICLE SEAT

CROSS-REFERENCE TO RELATED APPLICATIONS

This application is a continuation of U.S. patent application Ser. No. 12/398,146, now U.S. Pat. No. 8,434,961, filed Mar. 4, 2009, which claims priority to German Patent Application No. DE 10 2008 012 528.8, filed Mar. 4, 2008, both of which are hereby expressly incorporated by reference in their entirety as part of the present disclosure.

BACKGROUND OF THE INVENTION

The invention relates to a wobble joint fitting for an adjustment device of a motor vehicle seat, in particular for a seat back hinge fitting, with a) a first fitting part comprising an internal ring gear, with b) a toothed eccentric gear that engages the internal ring gear and that has an eccentric hole, with c) an eccentric comprising wedge segments, d) a rotatable drive part associated with the eccentric, e) a second fitting part that is adjustable with respect to the first fitting part, and f) a wrap spring.

Such type wobble joint fitting have been known in principle from the documents DE 10 2005 054 489 B4, DE 10 2004 007 043 B2, DE 102 030 06 A1 and DE 15 80 541 A. The wobble joint fitting shown therein do not have any wrap spring, but in wobble joint fitting utilized in practice, meaning in the motor vehicles, such wrap springs are provided. Usually, they are attached axially on the fitting as an outer additional part and have an axial dimension of about the same size as the fitting itself.

SUMMARY OF THE INVENTION

The wrap spring is intended to secure the operation. In principle, the wobble joint fitting is self-locking. However, in driving operation or in other situations, certain loads cause the wobble joint fitting to still get displaced. The wrap spring is intended to oppose this.

The wrap spring brakes utilized in prior art need considerable space. By means of a wrap spring, it is possible to achieve complete blocking, the reader being referred in this context to the documents P 37 29 134.3-16 and DE 3608858 A. Such type wrap springs are typical, completely stopping units. They project in the axial direction. Because of their dimensions and their bulkiness, wrap springs are utilized conditionally.

This is where the invention comes in. It is its object to further develop the wobble joint fitting of the type mentioned herein above in such a manner that a locking action of the wrap spring is integrated inside the fitting on the one side and that it needs almost no additional constructional space on the other side, at any rate that the outer dimensions of the joint fitting need not be changed.

In view of the wobble joint fitting of the type mentioned herein above, this object is achieved in that the wrap spring is a flat open spring ring, that the spring ring extends over an angle of less than 360° and that the eccentric wheel comprises a collar for the spring ring to fit against.

As opposed to prior art, the spring used is not a genuine wrap spring, which is wrapped many times, at any rate at least three times, typically at least 5 times, and accordingly has many windings; instead, a wrap spring is used that extends over less than 360°. Preferably however, it differs as little as possible from 360°. Such a spring can be configured as a flat part, in particular as a punched sheet steel part. Commercially available springs as they are generally known as axial securing elements on shafts or axles for securing the position or for guidance can be utilized, see for example Dubbel, Taschenbuch des Maschinenbaus, 20. Auflage, Stichwort G36 (*Pocket Book of Mechanical Engineering, 20th Edition, Catchword G36*). Such type securing elements are normalized DIN 471 T1 and T2, DIN 472 T1 and T2, DIN 983 and DIN 984. They are also referred to as circlip rings. The advantage thereof is that they are outspokenly flat, they are planar or deviate from planar by less than the material thickness thereof. Intersections between windings are obviated. Their overall height is significantly less than 1 mm; it may be less than 0.3 mm. Such a small component part can be accommodated inside an existing fitting and requires almost no additional space. This is a great advantage over prior art.

As compared to the previously known wrap springs, the annular washer wrap spring of the invention does not have a blocking action that makes it capable of suppressing all the movements of rotation between the fitting parts of the wobble joint fitting. But it has been found out that it perfectly secures the operation in cooperation with the wobble hinge fitting. At any rate, it is suited for practical use in cooperation with the wobble joint fitting for an almost complete suppression of automatic operation. As opposed to prior art, wherein the wrap spring alone stops the two joint fitting, the invention relies on the cooperation of the annular washer wrap spring and of the wobble joint fitting.

The wrap spring of the invention needs so little space that the outer dimensions of existing constructions can be maintained. This is the decisive advantage of the wobble joint fitting of the invention. Its operation is secured but its dimensions are not larger than those of a wobble joint fitting without prior art wrap spring.

In the mounted condition, the annular washer wrap spring is located between component parts of the wobble joint fitting and not outside these component parts or the wobble fitting. It more specifically is located inside the space defined by the fitting parts and needs no housing of its own, as this is the case in prior art. Preferably, the annular washer wrap spring is located between the toothed eccentric wheel and the eccentric. On the eccentric wheel there is provided a collar, friction is achieved in cooperation with the collar. Friction is controlled as will be explained hereinafter.

The spring ring is controlled through its two end regions. These end regions are formed so that they can be taken hold of. They project for example radially inwards or outwards, they may also, at need additionally, project axially with respect to the actual ring. It is also possible to use the holes in a commercially available circlip for control, for example by fastening pins in these holes.

Advantageously, there is provided a control part that is in charge of controlling the spring ring. In an advantageous developed implementation, it has one control flank for each wedge segment and additionally has opposing control surfaces between which there are located the end regions of the spring ring. Upon rotation of the control part the one or the other control surface strikes the neighboring end regions of the spring ring. In the normal position, the control surface fits with a slight pressure against these end regions or there is a small air gap between the control surfaces and the end regions.

In an advantageous developed implementation, a lug, which is located on a drive part, engages between the end regions of the spring ring. In this way, an adjustment movement is initiated. If the lug exerts a pressure on the neighboring end region with a lug flank located at the front in the direction of rotation and drives the end region, this end region is preferably slightly lifted from the collar. Accordingly, the braking action is reduced. If however the control surface of the control part exerts pressure and force onto the end region from the outside, the end region is pushed inward and is thus caused to fit stronger against the collar. Accordingly, the braking action is increased.

In an advantageous embodiment the annular spring is thicker in its 6 o'clock region located diametrically opposite the two end regions than anywhere else on its annular course. Its thickness diminishes uniformly, starting therefrom. This configuration is known from circlips.

Other features and advantages will become more apparent upon reviewing the appended claims and the following non restrictive description of two very similar embodiments of the invention, given by way of example only with reference to the drawings.

DETAILED DESCRIPTION OF THE INVENTION

Figure 1:
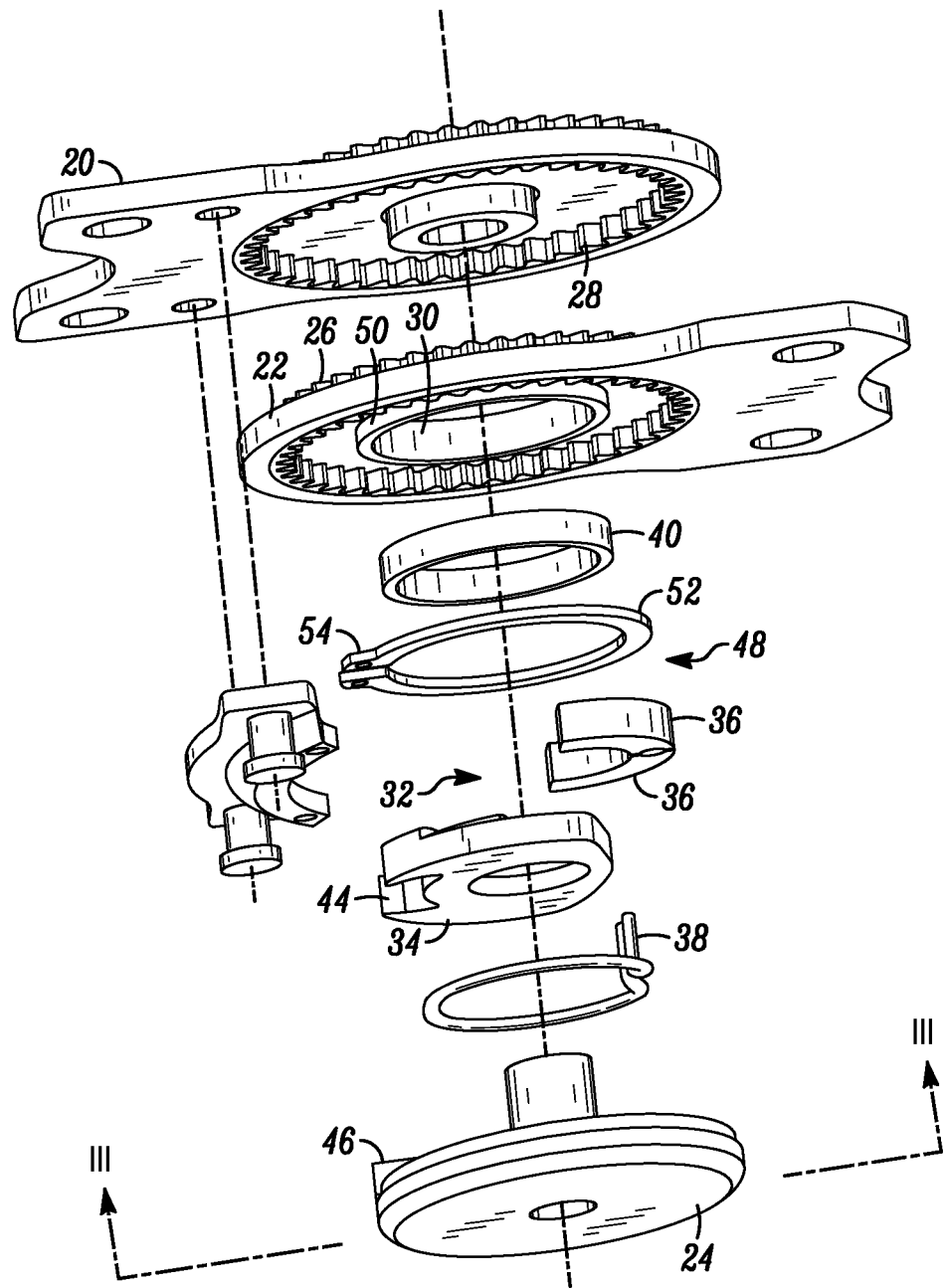
FIG. 1 shows a perspective assembly drawing of the wobble joint fitting of a first exemplary embodiment.

The wobble joint fitting has a first fitting part 20 and a second fitting part 22. The relative angular position of these fitting parts 20, 22 can be changed in a known way by the rotation of a drive part 24. In the exemplary embodiment shown, a toothed eccentric wheel 26 is formed on the second fitting part 22. It partially meshes an internal ring gear 28 that is formed on the first fitting part 20.

In another embodiment that has not been shown herein the eccentric wheel 26 is separate from the second fitting part 22. The second fitting part 22 is configured similar to the first fitting part 20, meaning it has an internal ring gear. The eccentric wheel 26 is engaged with the two internal ring gears of the two fitting parts 20, 22. In this implementation, the first fitting part 20 and the second fitting part 22 do not move radially with respect to each other during adjustment; only a movement of rotation is taking place.

On the eccentric wheel 26 there is provided an eccentric hole 30; it is centered on the gear ring of the eccentric wheel 26. An eccentric 32 engages this eccentric hole 30. It is in parts implemented by a control part 34, in parts by two wedge segments 36. The wedge segments 36 are biased with respect to each other in the circumferential direction by an omega spring 38. Zero clearance is thus achieved. FIG. 1 also shows a bearing sleeve 40 that is interposed between the eccentric hole 30 and the eccentric 32.

The control part 34 has two control flanks; they lie opposite small sides of the wedge segments 36. The control flanks 42 are configured on a semi-circle that is part of the eccentric 32.

The control part 34 further has two opposing control surfaces 44. They cooperate indirectly with a lug 46 on the drive part 24 as will be explained later.

An annular spring 48 or a spring ring is interposed between the eccentric 32 and the eccentric wheel 26. The eccentric wheel 26 has a collar 50 for the inner rim of the annular spring to rest thereon. In kinematic reversal, the collar may also define an inner cylinder and the annular spring can fit against the inner cylinder.

The annular spring 48 has an annular body 52, which extends over about 330 to 340° and is made from flat material, and also two end regions 54. The spring ring 48 is preferably made from one piece. In each end region 54 there are provided holes as this is the case in the commercially available retaining rings. They must not be provided but make mounting easier.

Figure 2:
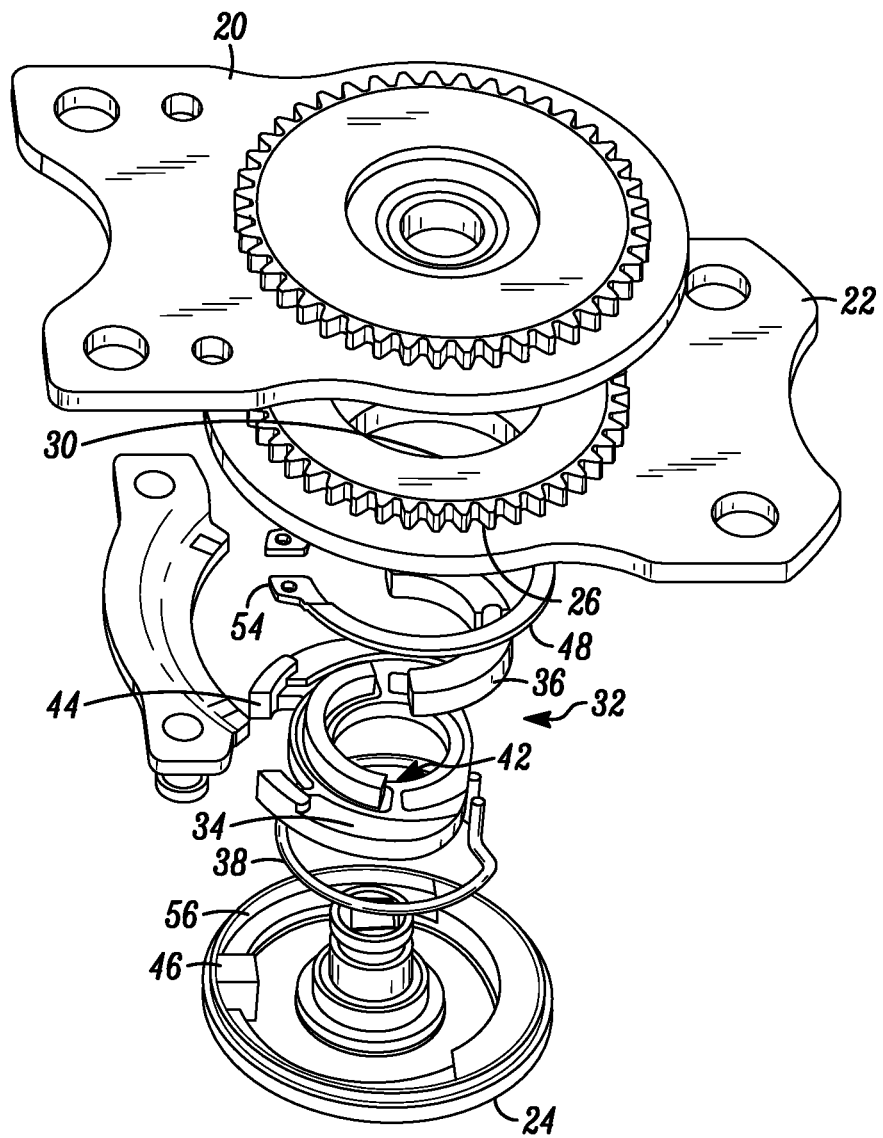
FIG. 2 also shows a perspective assembly drawing, but now in another viewing direction, of a second exemplary embodiment.

As contrasted with a normal circlip, the end regions 54 are bent at a right angle; this right-angle bend occurs in the axial direction and can be seen in FIG. 2. As a result, the end regions 54 project axially beyond the outer periphery of the annular body 52. On each end region 54 there are formed two abutment surfaces in the circumferential direction. They lie in opposite directions with respect to each other and will be discussed in closer detail hereinafter.

Figure 3:
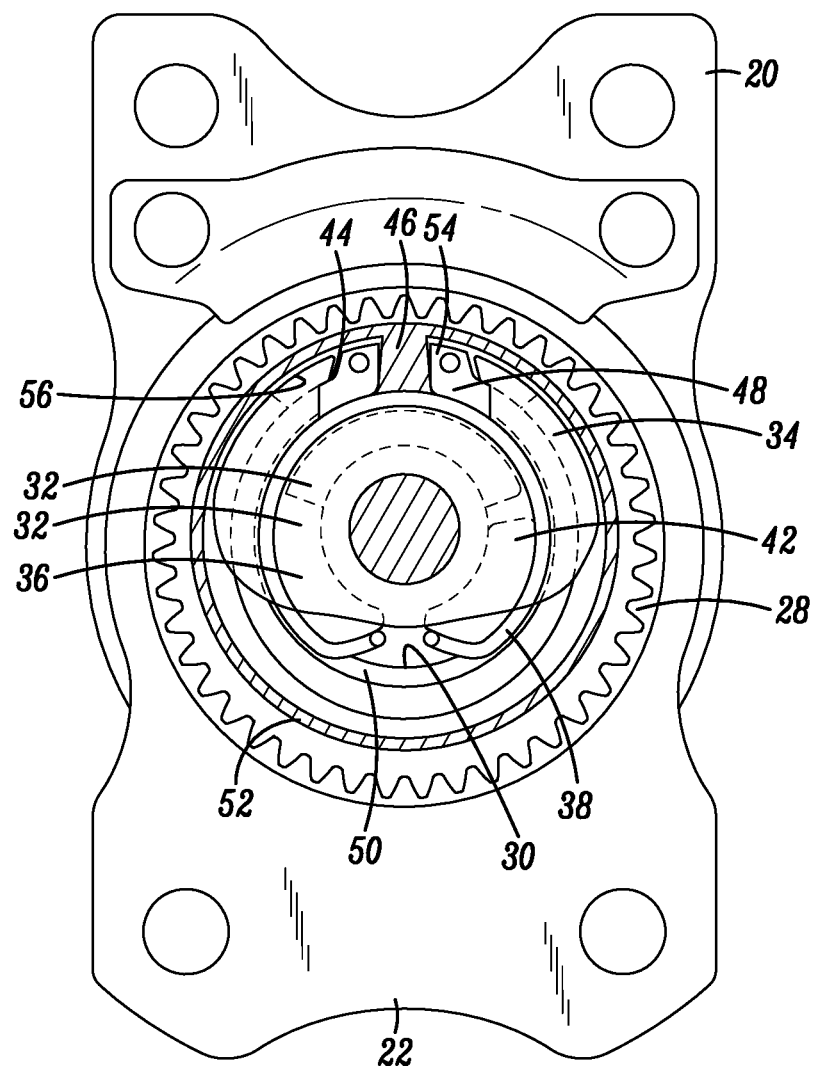
FIG. 3 shows an axial, in parts sectional, view in a viewing direction according to III-III in FIG. 1, of the second exemplary embodiment.

In the assembled condition, an outer abutment surface of each end region 54 is located in proximity to or in contact with a control surface 44. The associated inner abutment surface is in proximity to or in slight contact with the lug 46. This can be seen from FIG. 3. FIG. 3 shows the normal condition, the fitting is locked.

The annular spring 48 is controlled as follows, starting from the position shown in FIG. 3: if the drive part 24 is rotated and if, as a result thereof, the lug 46 moves in the circumferential direction, for example in a clockwise direction, the corresponding lug flank strikes the inner abutment flank of the right end region 54. Since the contact surface does not extend radially but rather deviates at least 5°, preferably at least 10°, from the radial and since the contact plane forms an angle with an associated diameter and the orientation is such that the inner abutment flanks almost lie on parallel planes, the lug 24 causes the right end region 54 to lift slightly from the collar 50 upon hitting it. For the subsequent drive movement, the annular spring 48 is slightly lifted so that its clamping action is reduced.

If, in the position shown in FIG. 3, at least one segment portion 36 starts to migrate, meaning if an operation takes place, its small surface hits the control flank 42 and causes the control part 34 to rotate. As a result, its control surface 44, which is located at the front in the direction of rotation, is caused to abut an outer abutment flank of the neighboring end region 54. Here, the geometry is chosen such that the control surface 44 pushes the neighboring end region 54 onto the collar 50 so that the clamping action is increased. In this way, operation is opposed. FIG. 3 shows that the planes in which the two outer abutment flanks of the end regions 54 lie intersect above in FIG. 3, at any rate on the side of the lug, which lies opposite an axis of rotation of the drive part 24. The control part 34 is configured like a wedge in the region of its control surfaces 44, the wedge angle ranges approximately between 20 and 40°. When the control part 34 is driven in the circumferential direction, this wedge is pushed between the abutment surface of the end region 54 and an inner wall 56 of the drive part 24 and gets jammed therein. In this way, the clamping action of the annular body 52 is increased.

Through the right-angle bend of the end regions 54 one achieves that the abutment surface will not come into contact with the control surfaces 44 on the side of their border but at a certain axial distance from the end of the control surface 44. The aim is that the abutment surfaces hit the control surface 44 approximately in the center thereof, when viewed in the axial direction.

The right-angle bend can be obviated and the end regions 54 can be left in the same plane as the annular body 52 if a groove into which a portion of the control surfaces 44 is allowed to plunge is provided in the eccentric wheel 26. Also, it is thus achieved that the abutment flanks will not hit the control surfaces 44 on the border side thereof.

Preferably, the spring ring 48 is a punched part. The end regions 54 are bent subsequently, after the punching operation.

What is claimed is:

1. A wobble joint fitting of an adjustment device of a motor vehicle seat comprising:
   a first fitting part comprising an internal ring gear;
   a toothed eccentric gear engaging the internal ring gear and having a collar with an inner surface defining an eccentric hole;
   an eccentric and a rotatable drive part associated with the eccentric, the eccentric comprising wedge segments engaging the inner surface, and configured and adapted to cause the eccentric gear to engage internal ring gear;
   a second fitting part operatively connected to the eccentric gear and adjustable with respect to the first fitting part;
   comprising a substantially annular body defining a surface extending along substantially an entire annular extent of the annular body, an entirety of said surface of the annular body lies in a single plane, the spring ring extends over an angle of less than 360°, the annular body fitting against an outer surface of the collar with an elastic braking force; and
   a control part having contact surfaces configured for contacting the wedge segments interposed between the drive part and the spring ring, wherein during operation of the fitting the control part contacts the wedge segments and the wedge segments do not contact the spring ring;
   wherein upon rotation of the drive part, the drive part engages the spring ring and lifts at least a region of the spring ring from the collar, thereby reducing said braking force thereon, and the spring ring engages the control part and rotates the eccentric and thereby the wedge segments, for enabling respective adjustment of the first and second fitting parts.

2. The wobble joint fitting as set forth in claim 1, wherein the spring ring further comprises two end regions and the end regions protrude radially from the annular body.

3. The wobble joint fitting as set forth in claim 2, wherein the drive part has a lug and the lug is located between the two end regions of the spring ring, and each of said two end regions are interposed between the control part and an end region of the drive part.

4. The wobble joint fitting as set forth in claim 3, wherein the lug has lug flanks that deviate from a radial direction by either (a) about 5 degrees or (b) about 15 degrees, and when the lug moves against a neighboring end region of the spring ring, said end region is slightly raised from the collar.

5. The wobble joint fitting as set forth in claim 1, wherein the annular body of the spring ring has a maximum material thickness of about 1 mm.

6. The wobble joint fitting as set forth in claim 1, wherein the annular body of the spring ring deviates from planar by less than the material thickness of the annular body.

7. The wobble joint fitting as set forth in claim 2, wherein the annular body of the spring ring has a larger dimension at a region thereof located diametrically opposite the end regions than anywhere else on the ring.

8. The wobble joint fitting as set forth in claim 2, wherein abutment flanks are provided on the end regions of the spring ring, the control part comprises opposing control surfaces, the control part comprises a border, and the abutment flanks contact the control surfaces at a distance from the border.

9. The wobble joint fitting as set forth in claim 8, wherein upon rotation of the control part, the control part engages the spring ring and pushes at least a region of the spring ring into the collar.

10. The wobble joint fitting as set forth in claim 8, wherein the control part has contact surfaces configured for contacting the wedge segments, the drive part has a lug configured to engage the spring ring during rotation of the drive part and lifts at least a region of the spring from the collar, thereby reducing said braking force thereon, and said spring engages the control part and rotates the eccentric, and the control part contacts the wedge segments, for enabling respective adjustment of the first and second fitting parts.

11. The wobble joint fitting as set forth in claim 1, wherein the annular body of the spring ring has a maximum material thickness of about 0.7 mm.

12. The wobble joint fitting as set forth in claim 1, wherein the annular body of the spring ring has a maximum material thickness of about 2 mm.

13. The wobble joint fitting as set forth in claim 2, wherein the drive part has a lug and the lug is located between the two end regions of the spring ring, the angular extension of the spring ring plus the angular extension of the lug plus necessary free space add up to a complete circle of 360°.

14. The wobble joint fitting as set forth in claim 1, wherein the control part comprises one control flank for each wedge segment, the control flank lying opposite a small side of the wedge segment, the control part further comprises opposing control surfaces and the spring ring comprises end regions located between the control surfaces.

15. The wobble joint fitting as set forth in claim 14, wherein each control surface forms with a tangent an angle of less than 60 degrees in a radial plane, and when the control surface moves against a neighboring end region of the spring ring, said end region is slightly pushed onto the collar.

16. The wobble joint fitting as set forth in claim 15, wherein the end regions are bent out of the plane locating the annular body.

17. The wobble joint fitting as set forth in claim 14, wherein each control surface forms with a tangent an angle of less than 80 degrees in a radial plane, and when the control surface moves against a neighboring end region of the spring ring, said end region is slightly pushed onto the collar.

18. The wobble joint fitting as set forth in claim 1, wherein the spring ring extends over an angle of ≥320°.

19. The wobble joint fitting as set forth in claim 1, wherein the spring ring is located axially between the eccentric and the eccentric gear.

20. The wobble joint fitting as set forth in claim 1, wherein the wobble joint fitting is a wobble joint fitting for a seat back hinge fitting.

21. The wobble joint fitting as set forth in claim 1, wherein the spring ring extends over an angle of ≥340°.

22. The wobble joint fitting as set forth in claim 1, wherein the spring ring does not include any lugs.

23. The wobble joint fitting as set forth in claim 1, wherein the drive part has a lug configured to engage the spring ring during said rotation of the drive part and lifts said at least a region of the spring from the collar.

\* \* \* \* \*